United States Patent
Bruneau et al.

(10) Patent No.: US 6,780,501 B2
(45) Date of Patent: Aug. 24, 2004

(54) TRANSPARENT THERMOPLASTIC COMPOSITION CONTAINING POLYTETRAFLUOROETHYLENE PARTICLES

(75) Inventors: Jean-Michel Bruneau, Gisors (FR); Alberto Luca Stasi, Rho (IT)

(73) Assignee: Atofina, Puteaux (FR)

( * ) Notice: Subject to any disclaimer, the term of this patent is extended or adjusted under 35 U.S.C. 154(b) by 44 days.

(21) Appl. No.: 10/221,033

(22) PCT Filed: Feb. 22, 2001

(86) PCT No.: PCT/FR01/00521

§ 371 (c)(1),
(2), (4) Date: Dec. 31, 2002

(87) PCT Pub. No.: WO01/66644

PCT Pub. Date: Sep. 13, 2001

(65) Prior Publication Data

US 2003/0119990 A1 Jun. 26, 2003

(30) Foreign Application Priority Data

Mar. 7, 2000 (FR) .............................. 00 02901

(51) Int. Cl.⁷ .............................. B32B 5/16; C08L 27/18
(52) U.S. Cl. ....................... 428/327; 428/218; 524/520; 525/199
(58) Field of Search ................................ 428/327, 218; 524/373, 520; 525/199

(56) References Cited

U.S. PATENT DOCUMENTS

| | | | |
|---|---|---|---|
| 3,005,795 A | | 10/1961 | Busse et al. |
| 4,491,553 A | | 1/1985 | Yamada et al. |
| 5,102,696 A | | 4/1992 | Pan et al. |
| 5,278,694 A | * | 1/1994 | Wheatley et al. ............ 359/359 |
| 5,681,875 A | * | 10/1997 | Huang et al. ................ 523/351 |
| 5,684,633 A | * | 11/1997 | Lutz et al. .................. 359/588 |
| 5,872,653 A | * | 2/1999 | Schrenk et al. ............. 359/498 |
| 6,015,610 A | * | 1/2000 | Minor et al. ............. 428/315.7 |
| 6,025,441 A | * | 2/2000 | Koshirai et al. ............ 525/199 |
| 6,469,072 B1 | * | 10/2002 | Bhatia et al. ................ 523/206 |
| 6,479,591 B2 | * | 11/2002 | Kapeliouchko et al. ..... 525/199 |
| 6,528,574 B1 | * | 3/2003 | Levy et al. .................. 524/520 |
| 6,632,383 B1 | * | 10/2003 | Peet .......................... 264/46.1 |

FOREIGN PATENT DOCUMENTS

| | | |
|---|---|---|
| DE | 1694217 | 4/1971 |
| DE | 3729872 | 3/1989 |
| DE | 4328384 | 3/1995 |
| EP | 0331456 | 9/1989 |
| WO | 91 09912 | 7/1991 |

* cited by examiner

*Primary Examiner*—H. Thi Le
(74) *Attorney, Agent, or Firm*—Millen, White, Zelano & Branigan, P.C.

(57) ABSTRACT

The thermoplastic composition according to the invention for shaped light-scattering articles, based on a transparent thermoplastic formed from (meth)acrylic (co)polymer and on light-scattering particles, comprises polytetrafluoroethylene (PTFE) particles or a mixture of PTFE particles and particles of a mineral and/or organic substance, these light-scattering particles having a mean size of 0.5 µm to 200 µm and a refractive index which differs from that of the transparent thermoplastic by at least ±0.05 and being used in an amount, with respect to the total composition, of 5 ppm to 2000 ppm by weight.

Figure 1:
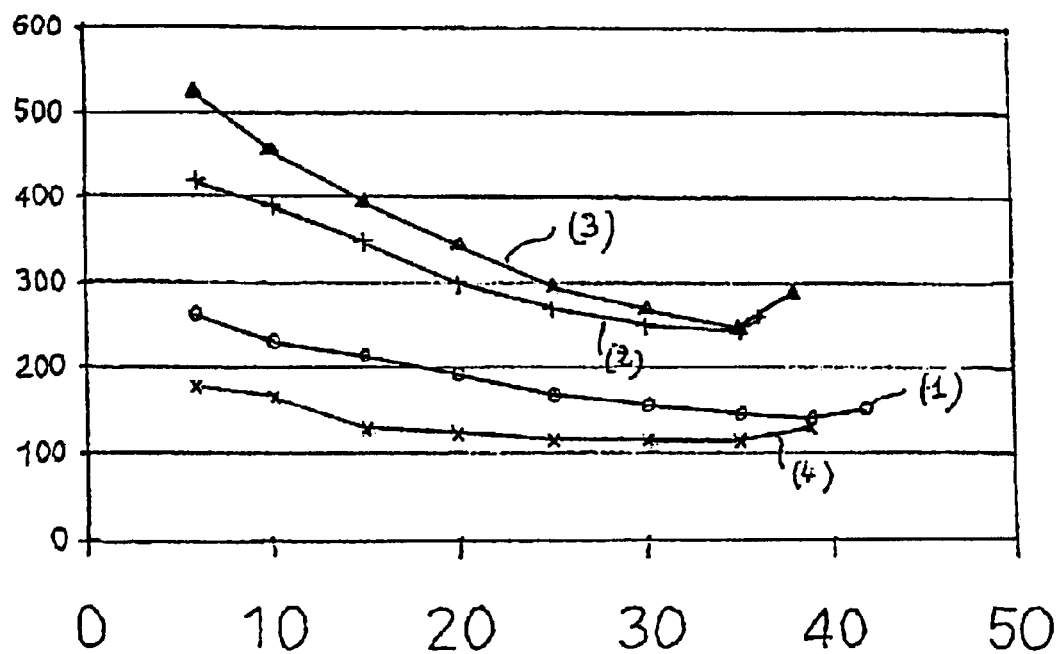

Application to light display devices and to flat light screens comprising a sheet obtained from the composition.

21 Claims, 4 Drawing Sheets

TRANSPARENT THERMOPLASTIC COMPOSITION CONTAINING POLYTETRAFLUOROETHYLENE PARTICLES

DESCRIPTION

The present invention relates to a transparent plastic composition comprising polytetrafluoroethylene (PTFE) particles or a mixture of these PTFE particles and of mineral and/or organic particles, which composition can be used to form shaped articles, particularly sheets acting as a light guide and as a light scatterer. These sheets can be used in particular for light display systems, such as light display panels for advertising or information purposes, and for flat luminous screens useful, for example, for liquid-crystal devices.

Light display systems are known and generally comprise, mounted in an appropriate frame, an assembly comprising a sheet or panel of transparent plastic containing particles of a material able to scatter light.

The light source, generally fluorescent tubes, may be located near one face of the thermoplastic panel and light is observed, via the opposite face, which is transmitted directly and that which is scattered by the particles contained in the panel. In this case, the thermoplastic panel contains a large number of scattering particles in order to make it sufficiently opaque to mask the light source. The panel is incorporated into a box containing the fluorescent tubes. These tubes must be numerous enough to ensure good distribution of the light intensity. This box has the drawback of being thick and this device consumes a great deal of energy.

The light source may also be placed near one or more edges of the panel so that the latter is edge-lit. This type of panel then functions as a light guide. The light is therefore reflected and scattered by the scattering particles contained in the panel and some of the scattered light is observed through one or both faces of the panel. If the panel contains a large amount of scattering particles, the optical path followed by the light is short and part of the surface will be poorly lit or not lit at all. If the panel contains few scattering particles, the intensity of the scattered light is low. The scattered light intensity decreases with distance from the light source.

Attempts have therefore been made to find compositions made of a transparent thermoplastic that can be moulded into shaped articles, particularly in the form of sheets which can be used, for example, as panels in light display devices which, while containing a minimum quantity of scattering particles, produce a maximum and uniform scattered light intensity over the entire surface of the shaped article. It has been found, as described in European Patent Application EP-A-0,893,481, that it is possible to combine with the transparent thermoplastic, particularly polymethyl methacrylate, a defined amount (from 20 ppm to 1000 ppm) of a particular additive (a polyamide) in the form of particles having a mean size of between 0.4 and 200 $\mu$m. Compared with the conventional solutions, this device reduces the energy consumption, provides an aesthetic advantage, by reducing the thickness of the light panel, and may lighten the supporting structure.

Attempts have also been made to improve the luminous efficiency of the shaped articles, particularly sheets.

The thermoplastic composition according to the invention for shaped light-scattering articles, based on a transparent thermoplastic formed from (meth)acrylic (co)polymer and on light-scattering particles, comprises polytetrafluoroethylene (PTFE) particles or a mixture of PTFE particles and particles of a mineral and/or organic compound, these light-scattering particles having a mean size of 0.5 $\mu$m to 200 $\mu$m and a refractive index which differs from that of the transparent thermoplastic by at least ±0.05 and being used in an amount, with respect to the total composition, of 5 ppm to 2000 ppm by weight.

The light-scattering particles preferably have a mean size of 2 $\mu$m to 20 $\mu$m.

The thermoplastic composition according to the invention preferably contains from 10 to 200 ppm and particularly from 30 to 100 ppm by weight of light-scattering particles.

The refractive index of the light-scattering particles preferably differs from that of the thermoplastic by at least ±0.1.

The composition according to the invention may also contain additives such as colorants.

The thermoplastic (meth)acrylic (co)polymer may, in particular, consist of an alkyl methacrylate homopolymer or of a copolymer derived from an alkyl methacrylate and at least one monomer containing one or more ethylenically unsaturated groups copolymerizable with the alkyl methacrylate.

As alkyl methacrylate, mention may especially be made of compounds in which the alkyl group has from 1 to 8 carbon atoms, for example methyl methacrylate, ethyl methacrylate, propyl methacrylate, isopropyl methacrylate and butyl methacrylate. A particularly preferred monomer is methyl methacrylate.

The thermoplastic (meth)acrylic (co)polymer preferably comprises from 70 to 100% by weight of the main monomer: the alkyl methacrylate, and from 0 to 30% by weight of monomer(s) containing one or more ethylenically unsaturated groups copolymerizable with the alkyl methacrylate. This (these) monomer(s) containing one or more ethylenically unsaturated groups is (are) chosen, for example, from $C_1$–$C_8$ alkyl acrylates, styrene, substituted styrenes, acrylonitrile, methacrylonitrile, $C_1$–$C_8$ alkyl methacrylates differing from the main monomer, hydroxyalkyl acrylates and methacrylates, alkoxyalkyl or aryloxyalkyl acrylates and methacrylates, in which the alkyl group has from 1 to 4 carbon atoms, acrylamide, methacrylamide, acrylic acid, methacrylic acid, maleimides and alkylene glycol dimethacrylates, in which the alkylene group has from 1 to 4 carbon atoms.

The (meth)acrylic (co)polymers may be obtained by any known process, for example by suspension polymerization or bulk polymerization.

Preferably, the light-scattering particles consist only of PTFE.

The light-scattering particles may also consist of a mixture comprising PTFE particles, preferably as the major component, and particles of a mineral compound, such as titanium dioxide, barium sulphate and zinc oxide, and/or particles of an organic compound, such as crosslinked polystyrene or particles with a multilayer, for example bilayer, structure which are formed from at least one crosslinked polystyrene core.

The composition according to the invention may also be obtained by blending the thermoplastic, for example in granule form, the light-scattering particles (polytetrafluoroethylene and, optionally, particles of a mineral and/or organic compound) and, optionally, other additives such as colorants, these particles and additives generally being in the form of a masterbatch. This blend may be produced in any appropriate device.

The shaped light-scattering articles that may be manufactured from the thermoplastic composition described above may be obtained by various known moulding processes, particularly using extrusion, injection and compression, advantageously extrusion. Sheet products and moulded products are then obtained in various shapes.

The composition according to the invention is particularly suitable for manufacturing articles by extrusion. Now, in order for the shaped article to have scattering properties, the composition from which it is manufactured must contain particles which do not melt at the temperature used for the extrusion. The composition according to the invention, containing PTFE particles, is particularly suitable since these particles have a high melting point (320° C.). This is also the case with the compositions which comprise a mixture of particles as described above, particularly that based on PTFE and crosslinked polystyrene.

The shaped articles may also be obtained directly in the form of sheets by the bulk polymerization of a mixture of (meth)acrylic monomers and optionally of their prepolymers, in the presence of light-scattering particles (polytetrafluoroethylene and, optionally, particles of a mineral and/or organic compound) and of the other optional additives, in a mould formed by two glass sheets (casting process).

For this bulk polymerization, it is possible to use any known free-radical initiator, for example diazo compounds, such as azobis(isobutyronitrile) (AIBN), and peroxides, such as benzoyl peroxide. The copolymerization generally takes place in the presence of a chain-transfer agent, such as diunsaturated monocyclic terpenes and monounsaturated bicyclic terpenes, such as terpinolene, and mercaptans, such as tert-dodecyl mercaptan.

It is also possible to add agents promoting mould release of the sheets, for example stearic acid and sodium dioctylsulphosuccinate, in the amount normally used.

The shaped articles according to the invention, particularly sheets, may also consist of a transparent thermoplastic, such as those mentioned above, having a concentration of light-scattering particles, such as those defined in the invention, which varies throughout the thickness of the article, the highest concentration being in a region close to the scattering surface. This concentration difference through the thickness of the article may be gradual, being in the form of a concentration gradient. This embodiment makes it possible to increase the light transmission-in that region of the article having a lower light-scattering-particle concentration and, consequently, greater uniformity of the scattered-light intensity over the entire area of the article, particularly in the regions remote from the light source. The light-scattering-particle concentration may also vary along the length of the shaped article, particularly a sheet, the lowest concentration being in the region close to the light source.

The sheets, obtained from the compositions according to the invention, may have thicknesses that differ depending on the envisaged use, and especially that range from 3 mm to 25 mm. In the case of light display systems for advertising purposes, the thickness is generally from 8 to 20 mm. In the case of flat light screens, it is generally from 3 to 6 mm.

Extrusion is a suitable process for manufacturing articles (sheets, for example) with the abovementioned thicknesses, and particularly with a small thickness. The extrusion process provides a thickness tolerance which is tight compared with other manufacturing processes, thereby ensuring reproducibility of the sheets, and therefore of the emitted luminous intensity, and making it easier to mount the sheets in frames with precise dimensions. This type of specification is particularly required for the production of flat light screens.

It is also possible to manufacture light-scattering panels which comprise, for example, a support made of a transparent thermoplastic, such as that mentioned above, and a scattering layer formed from the scattering thermoplastic composition described above, this layer being placed on one or both faces of the support. This product may be obtained by any suitable process, for example by coextrusion or coating. In this embodiment, the support may have a thickness of 2 to 25 mm and the scattering layer or layers a thickness of 20 to 1000 µm.

The sheets obtained from the compositions according to the invention may be used in any light-display system, and especially that described in Patent Application EP-A-0,893,481.

The sheets according to the invention may also be used as flat light screens, for example for liquid-crystal (LCD—Liquid Crystal Liquid) screens.

Means can be used to improve the intensity of the light scattered by the shaped articles. In particular, in the case of sheets, these are, for example, screen-printed dots on at least one face of the sheets; or else these are films in the form of parallel adhesive strips which may or may not be uniformly spaced apart, the distance separating these strips possibly being shorter the further they are away from the light source. These films are placed on one face or on both faces (the face via which the scattered light is observed and/or the opposite face). Preferably, only the face opposite that via which the scattered light is observed carries a film in the form of parallel strips. These strips adhere to the surface of the panel by any suitable means. If the film on the opposite face to that via which the scattered light is observed is in the form of strips, a film or a sheet may be placed over this film in order to avoid light losses.

The following examples illustrate the present invention without however limiting its scope. The following abbreviations have been used:

| | |
|---|---|
| MMA: | methyl methacrylate |
| PMMA: | polymethyl methacrylate |
| PTFE: | polytetrafluoroethylene |
| PA: | polyamide |
| PVC: | polyvinyl chloride |
| PS: | polystyrene (crosslinked). |

The PMMA, in bead form, used for the manufacture of extruded sheets was that sold by Atoglas under the name "OROGLAS® 9EL".

the PTFE particles used as light-scattering additive were those sold by DuPont de Nemours under the name "ZONYL® 1200" having a mean diameter of 4 µm and those sold under the name "ZONYL® 1000" and having a mean particle diameter [lacuna] 11 µm. The refractive index of PTFE is n=1.376 ("Polymer Handbook, Wiley Interscience Publication"), thus being significantly different from that of PMMA (n=1.498).

the PS particles used as light-scattering additive were those sold by Sekisui under the tradename "PS grade SBX-6". These particles have a mean diameter of 6 µm and a refractive index n of 1.5916).

The reference (control) sheets with which the sheets of the invention obtained by casting or extrusion have been compared were cast sheets of PMMA having a thickness of 8 mm, 5 mm and 15 mm (the reference sheets are denoted respectively as $R_8$, $R_5$ and $R_{15}$), sold by Atoglas under the name "ALTUGLAS ELIT®". These sheets contain, as light-scattering additives, a polyamide sold by Elf Atochem S. A. under the name "ORGASOL 2001®" in an amount of 150 ppm.

Figure 2:
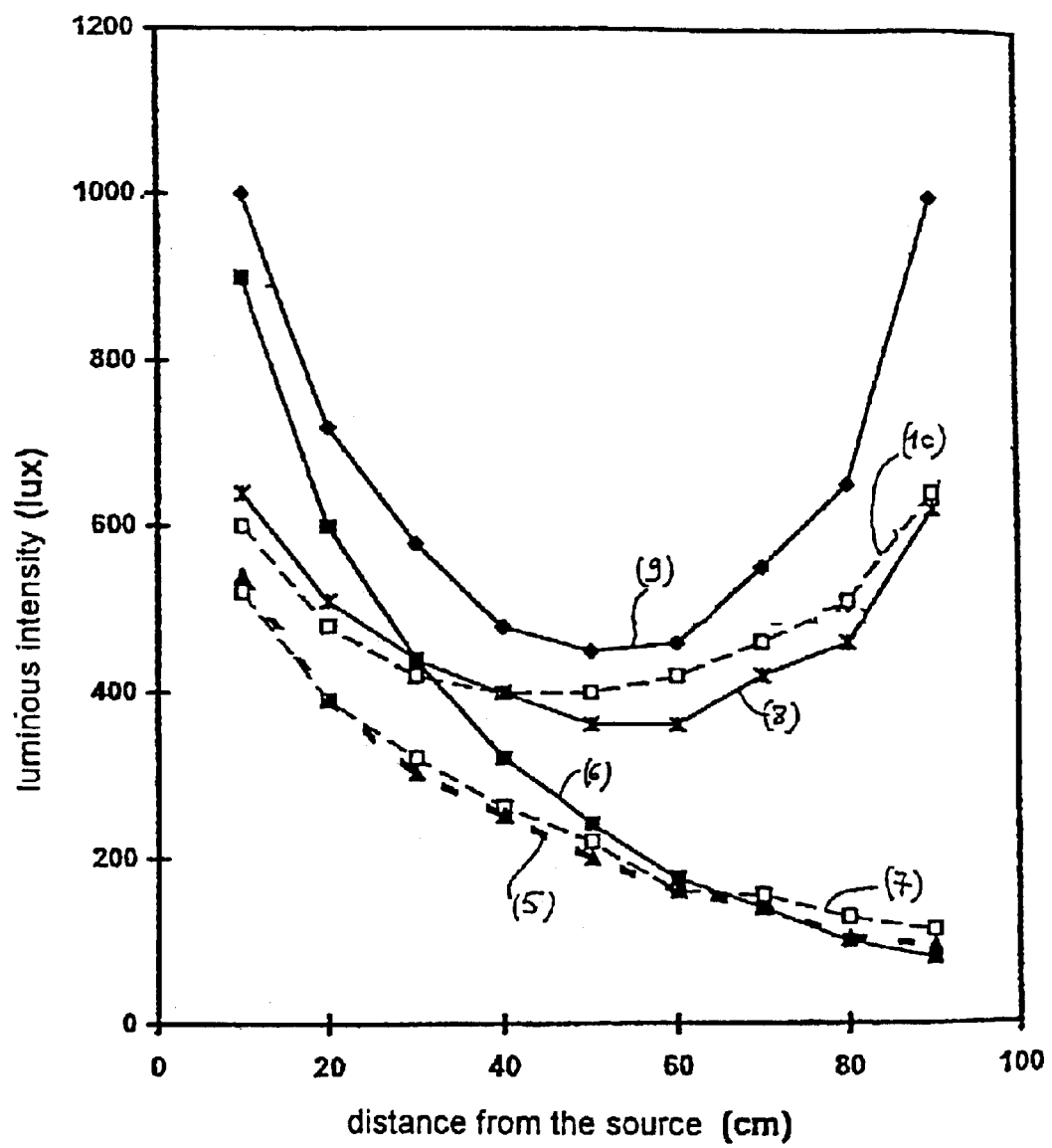
Figure 3:
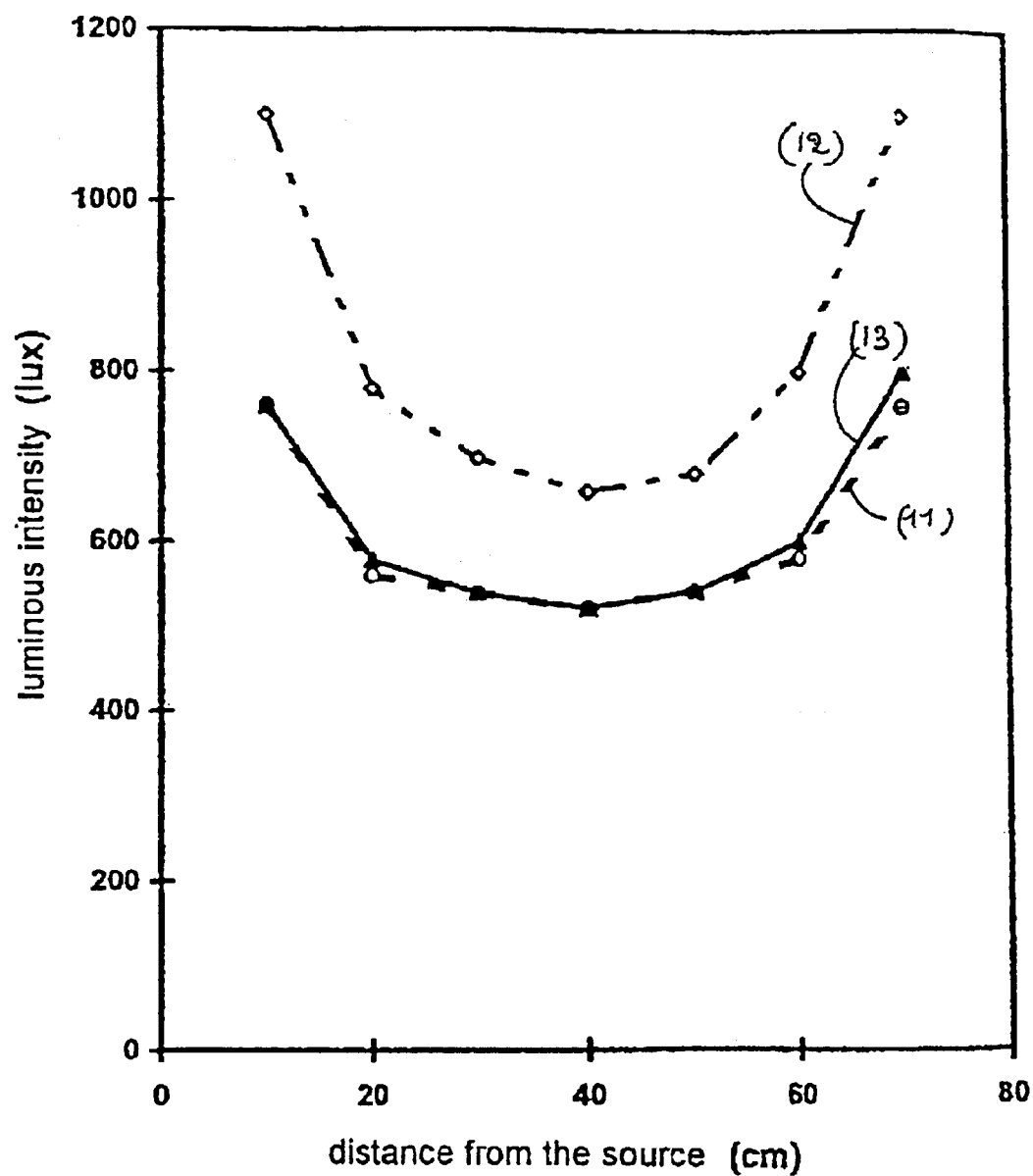

Illustrated in the appended drawing are:

in FIG. 1, the graphs of the luminous intensity (expressed in lux) as a function of the distance (expressed in cm) from the light source in the case of the cast sheets according to the invention of Examples 1 to 3 (graphs 1, 2 and 3) and in the case of the reference cast sheet $R_8$ (graph 4), with illumination at one edge of the sheets;

In FIG. 2, the graphs of the luminous intensity (expressed in lux) as a function of the distance (expressed in cm) from the light source in the case of the extruded sheets (8 mm thick) according to the invention of Examples 4 and 5 and in the case of the reference cast sheet $R_8$ (8 mm thick) with illumination, on the one hand at one edge of the sheets (graphs 5, 6 and 7) and, on the other hand, at both edges of the sheets (graphs 8, 9 and 10) over a length of 100 cm; graphs 5 and 6 correspond to sheets containing 30 ppm and 60 ppm of PTFE, respectively. Graph 7 corresponds to the control $R_8$. Graphs 8 and 9 correspond to the sheets containing 30 ppm and 60 ppm of PTFE, respectively, and graph 10 corresponds to the control $R_8$;

In FIG. 3, graphs (11, 12 and 13) of the luminous intensity (expressed in lux) as a function of the distance (expressed in cm) from the light source in the case of the extruded sheets (8 mm thick) according to the invention of Examples 4 and 5 and in the case of the reference cast sheet $R_8$, with illumination at the two edges of the sheets, over a length of 80 cm. Graphs 11 and 12 correspond to the sheets containing 30 ppm and 60 ppm of PTFE, respectively. Graph 13 corresponds to the control $R_8$.

Figure 4:
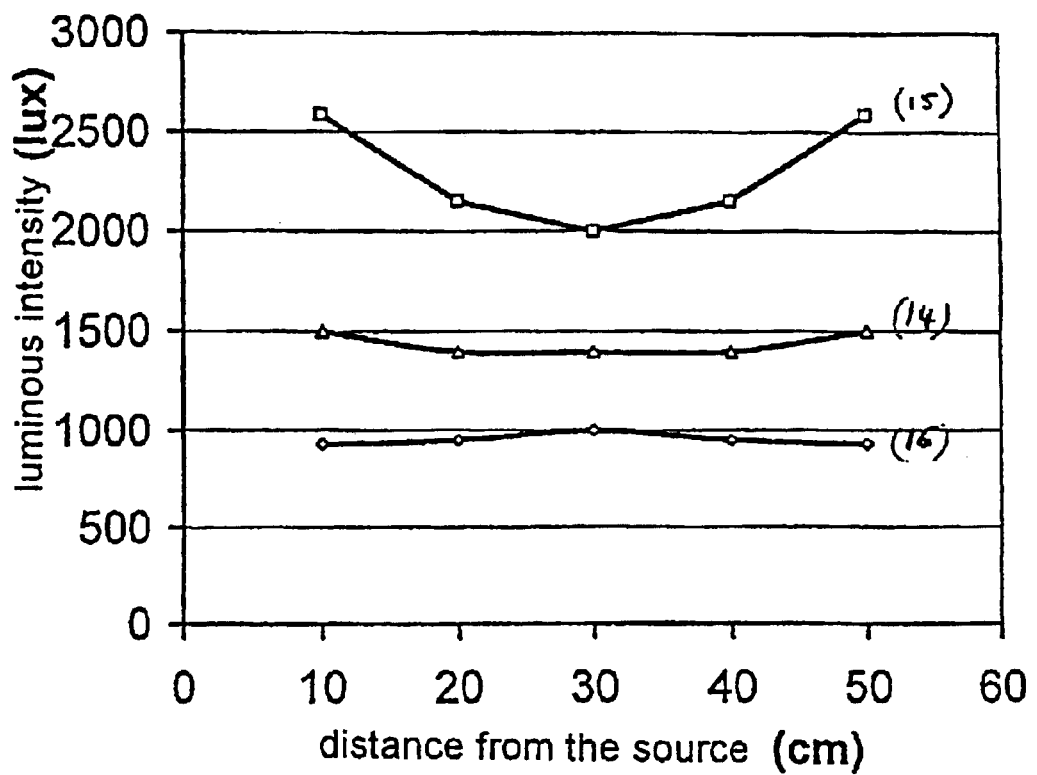

In FIG. 4, the graphs (14, 15 and 16) of the luminous intensity (expressed in lux) as a function of the distance (expressed in cm) from the light source in the case of the extruded sheets (15 mm thickness) according to the invention of Examples 6 and 7 and in the case of the reference cast sheet $R_{15}$, with illumination at the two edges of the sheets, over a length of 60 cm. Graph 14 corresponds to the sheet containing 46 ppm of PTFE. Graph 15 corresponds to the sheet containing 50 ppm of PTFE and 20 ppm of PS. Graph 16 corresponds to the control $R_{15}$.

EXAMPLES 1 TO 3

Manufacture of Cast Sheets of PMMA Incorporating PTFE (a) General Operating Method A prepolymer was prepared by adding 20 ppm by weight of 2,2-azobis(isobutyronitrile) catalyst to MMA. The mixture was heated at 90° C. so as to obtain a degree of conversion of about 7%. Once this prepolymer had cooled, the amounts of catalyst necessary for the polymerization (250 ppm by weight) together with 55 ppm by weight of chain-transfer agent (terpinolene) were added, as well as the additive which causes light scattering, namely particle of "ZONYL® 1200" PTFE (4 μm mean particle diameter) in the amounts indicated in Table 1. Conventional demoulding agents were also incorporated.

Furthermore, a mould was produced by means of two glass sheets separated around their periphery by a flexible PVC seal. The diameter of the seal determines the thickness of the final sheet. These elements were assembled using metal clamps. The dimensions of the sheets prepared were 200× 500×10 mm.

The mixture was subjected to a vacuum for 30 minutes, so as to remove the air contained, and then it was cast into the mould described above. Once the mould had been filled, it was closed and put into a ventilated oven so as to polymerize the MMA. The temperature cycle consisted in heating at 55° C. for 600 minutes and then at 120° C. for 2 hours so as to ensure maximum conversion.

| Example | Light-scattering additive | Content of this additive (ppm) |
| --- | --- | --- |
| 1 | PTFE | 40 |
| 2 | PTFE | 60 |
| 3 | PTFE | 90 |
| Control $R_8$ | Polyamide | 150 |

(b) Determination of the Luminous Intensity Obtained from Cast Sheets

In order to carry out this determination, each of the sheets was illuminated by means of a 13-watt REFLEX® fluorescent tube sold by Philips, applied at the edge of the sheet having the dimensions as prepared above. The fluorescent tube was placed in a profile having a 10 mm lip. The sheet was inserted into this lip. In this way, the light emitted was directed exclusively from the side of the sheet. The side in contact with the light was polished beforehand, the other sides having been coated with the polyester reflective film sold under the name "TAPE 850" by 3M. In order to reflect the light, an opaque white background was placed at the front on the opposite face of the sheet to that for which the scattered light is observed. This arrangement is similar to that in FIG. 2 of EP-A-0,893,481, except that it is not provided here with the sheet 12 serving to simulate an advertising display.

The determination of the luminous intensity was carried out facing the sheets thus prepared. The luminous intensity was measured at the surface of each of the sheets with a light meter, the cell of which was placed at a distance of 5 cm to 45 cm from the light source.

(c) Results

It may be noted in FIG. 1 that an increase in luminous intensity is obtained with the sheets of Examples 1 to 3 (graphs 1 to 3) compared with graph 4, relating to the reference cast sheet $R_8$ (150 ppm of scattering additive).

EXAMPLES 4 AND 5

Manufacture of Extruded Sheets of PMMA Incorporating PTFE

Extruded sheets of PMMA, measuring 2000 mm×3000 mm×8 mm and containing "ZONYL® 1000" PTFE particles (11 μm mean diameter) in an amount of 30 and 60 ppm (Examples 4 and 5, respectively), were produced by introducing 1% (Example 4) or 2% (Example 5) of a masterbatch consisting of 3000 ppm of PTFE in PMMA into a single-screw extruder; the material (PMMA+PTFE) was heated to a temperature of between 220 and 240° C. in the extruder. The sheets (2000 mm×3000 mm×8 mm) obtained were cut to the dimensions required (30 cm width and 80 cm or 100 cm length).

FIGS. 2 and 3 of the appended drawing describe the behaviour of the sheets according to Examples 4 and 5, compared with that of the reference sheet $R_8$.

The sheets were studied over a length of 100 cm (FIG. 2), these being illuminated at one edge (graphs 5, 6 and 7) and at two edges (graphs 8, 9 and 10). They were also studied over a length of 80 cm (FIG. 3), these being illuminated at the two edges (graphs 11, 12 and 13). The illumination sources were 13-watt Reflex® tubes from Philips, so as to simulate the behaviour of a display holder. The illumination at one edge corresponds to the arrangement in FIG. 2 of EP-0,893,481 and that at the two edges corresponds to the arrangement in FIG. 1 of this same patent application, except that it is not provided here with the sheet 12 serving to simulate an advertising display.

The results obtained with the sheets containing 30 ppm of PTFE of Example 4 (graphs 5, 8 and 11) are quite comparable with those of the reference cast sheet $R_8$ of the same thickness, but containing 150 ppm of scattering additive (FIGS. 2 and 3), whether the illumination is at one or both edges of the sheets. The sheet according to Example 5 containing 60 ppm of PTFE (graph 9) has a higher luminous intensity than that of the reference $R_8$ containing 150 ppm of scattering additive (see FIG. 2 in the case of illumination at both edges). FIG. 3 also allows one to conclude that the sheet according to Example 5 (graph 12), the length of which is less than 80 cm, has a luminous intensity at the centre which is 26% greater than that obtained with the reference sheet $R_8$ (graph 13). The uniformity of the luminous intensity is barely affected.

EXAMPLE 6

Extruded Sheet of PMMA Containing PTFE

An extruded sheet of PMMA, with a width of 2000 mm and a length of 3000 mm and a thickness of 15 mm and containing 46 ppm of "ZONYL® 1000" PTFE particles, was prepared by introducing 2% of a master batch consisting of 2300 ppm of PTFE in PMMA into the single-screw extruder of Examples 4 and 5.

The luminous intensity of sheets with the dimensions 30×60 cm, obtained from this extruded sheet, is measured.

FIG. 4 of the appended drawing shows the behaviour of the sheet of Example 6 (graph 14) with comparison with that of the reference sheet $R_{15}$ (graph 16).

The sheets were studied over a length of 60 cm while being illuminated at the two edges by two Reflex® fluorescent tubes with a power of 13W from Philips.

It may be noted that the luminescent intensities of the sheet according to Example 6 (graph 14) and the control sheet (graph 16) are uniform over the entire length of the sheets. The luminous intensity of the sheet obtained in Example 6 is greater than that of the control $R_{15}$.

EXAMPLE 7

Extruded Sheet of PMMA Containing PTFE and PS

As in Examples 4 and 5, an extruded sheet of PMMA with dimensions of 2000 mm×3000 mm was prepared. The sheet of Example 7 has a thickness of 15 mm and contains a mixture of 50 ppm of "ZONYL® 1000" PTFE particles and 20 ppm of "PS grade SBX-6" crosslinked PS particles from Sekisui. It was obtained by introducing 2% of a master batch consisting of 2500 ppm of PTFE and 1000 ppm of PS in PMMA into the single-screw extruder of Examples 4 and 5. The luminous intensity is measured on sheets with dimensions of 30×60 cm.

FIG. 4 of the appended drawing shows the behaviour of the sheet of Example 7 (graph 15) with comparison with that of the reference sheet $R_{15}$ (graph 16). The sheets were studied over a length of 60 cm of of being illumated at the two edges by two Reflex® fluorescent tubes with a power of 13W from Philips.

The luminous intensity of the sheet obtained in Example 7 is greater than those obtained with the reference sheet $R_{15}$ and the sheet of Example 6.

What is claimed is:

1. In a thermoplastic composition suitable for shaped light-scattering articles comprising a transparent thermoplastic formed from (meth)acrylic (co)polymer and light-scattering particles, the improvement wherein the light scattering particles comprise polytetrafluoroethylene (PTFE) particles or a mixture of PTFE particles with particles selected from the group consisting of (A) mineral particles, (B) particles of an organic compound, and mixtures thereof, said light-scattering particles having a mean size of 0.5 µm to 200 µm and a refractive index which differs from that of the transparent thermoplastic by at least ±0.05 and being used in an amount, with respect to the total composition of 5 ppm to 2000 ppm by weight.

2. A thermoplastic composition according to claim 1, wherein the light-scattering-particle content is from 10 to 200 ppm.

3. A thermoplastic composition according to claim 1, wherein the light-scattering particles have a mean size of between 2 µm and 20 µm.

4. A thermoplastic composition according to claim 1, wherein the light-scattering particles consist of polytetrafluoroethylene.

5. A thermoplastic composition according to claim 1, wherein the light-scattering particles comprise a mixture of mostly polytetrafluoroethylene particles.

6. A thermoplastic composition according to claim 1, wherein the light-scattering particles comprise polytetrafluoroethylene particles and particles based on crosslinked polystyrene.

7. A thermoplastic composition according to claim 1, wherein the light-scattering particles comprise polytetrafluoroethylene particles and particles of a mineral compound selected from the group consisting of titanium dioxide, barium sulphate and zinc oxide.

8. A thermoplastic composition according to claim 1, comprising a thermoplastic (meth)acrylic (co)polymer selected from the group consisting of polyalkyl methacrylates and copolymers of an alkyl methacrylate and at least one monomer containing one or more ethylenically unsaturated groups copolymerizable with the alkyl methacrylate.

9. Thermoplastic composition according to claim 8, characterized in that the thermoplastic (co)polymer comprises:

from 70 to 100% by weight of the main monomer: the alkyl methacrylate; and 0 to 30% by weight of monomer(s) containing one or more ethylenically unsaturated groups copolymerizable with the alkyl methacrylate.

10. Thermoplastic composition according to claim 9, characterized in that the monomer(s) containing one or more ethylenically unsaturated groups are chosen from $C_1$–$C_8$ alkyl acrylates, styrene, substituted styrenes, acrylonitrile, methacrylonitrile, $C_1$–$C_8$ alkyl methacrylates differing from the main monomer, $C_1$–$C_4$ hydroxyalkyl acrylates and methacrylates, $C_1$–$C_4$ alkoxyalkyl or $C_1$–$C_4$ aryloxyalkyl acrylates and methacrylates, acrylamide, methacrylamide, acrylic acid, methacrylic acid, maleimides and alkylene glycol dimethacrylates in which the alkylene group has from 1 to 4 carbon atoms.

11. A thermoplastic composition according to claim 8, wherein the alkyl methacrylate has from 1 to 8 carbon atoms in the alkyl group.

12. Thermoplastic composition according to claim 11, characterized in that the alkyl methacrylate is methyl methacrylate.

13. A shaped light-scattering article formed from the thermoplastic composition as defined in claim 1, by moulding using extrusion, injection, compression or casting.

14. Article according to claim 13 shaped in the form of a sheet.

15. Shaped article according to claim 14, comprising a light-scattering-particle concentration varying throughout the thickness of the sheet, the highest concentration being in a region close to the scattering surface or else varying along the length of the sheet, the lowest concentration being in the region close to the light source.

16. A shaped article according to claim 14, characterized in that the sheet has a thickness of 3 mm to 25 mm.

17. A shaped article according to claim 14, comprising on at least one face, screen-printed dots or films in the form of parallel adhesive strips.

18. Light display systems or flat light screens comprising shaped articles according to claim 13.

19. A shaped light-scattering article comprising a support made of a transparent thermoplastic formed from (meth) acrylic (co)polymer and a layer of a composition as defined in claim 1.

20. Article according to claim 19, characterized in that it is obtained by coextrusion or coating.

21. A shaped article according to claim 19, wherein the support has a thickness of 2 mm to 25 mm and the layer formed by the composition has a thickness of 20 to 1000 $\mu$m.

* * * * *